US009602530B2

(12) United States Patent
Ellis et al.

(10) Patent No.: US 9,602,530 B2
(45) Date of Patent: Mar. 21, 2017

(54) SYSTEM AND METHOD FOR PREDICTING IMPENDING CYBER SECURITY EVENTS USING MULTI CHANNEL BEHAVIORAL ANALYSIS IN A DISTRIBUTED COMPUTING ENVIRONMENT

(71) Applicant: ZitoVault, Inc., Escondido, CA (US)

(72) Inventors: Alonzo Ellis, Malvern, PA (US); Tim McELwee, Escondido, CA (US)

(*) Notice: Subject to any disclaimer, the term of this patent is extended or adjusted under 35 U.S.C. 154(b) by 0 days.

(21) Appl. No.: 14/672,869

(22) Filed: Mar. 30, 2015

(65) Prior Publication Data

US 2016/0028758 A1   Jan. 28, 2016

Related U.S. Application Data

(60) Provisional application No. 61/972,105, filed on Mar. 28, 2014.

(51) Int. Cl.
| | |
|---|---|
| G06F 17/30 | (2006.01) |
| H04L 29/06 | (2006.01) |
| G06F 21/52 | (2013.01) |
| G06F 21/55 | (2013.01) |
| G06F 21/57 | (2013.01) |
| G06Q 30/00 | (2012.01) |

(52) U.S. Cl.
CPC .... *H04L 63/1433* (2013.01); *G06F 17/30958* (2013.01); *G06F 21/52* (2013.01); *G06F 21/554* (2013.01); *G06F 21/577* (2013.01); *G06Q 30/018* (2013.01); *G06Q 30/0185* (2013.01); *H04L 63/0227* (2013.01); *H04L 63/14* (2013.01); *H04L 63/1416* (2013.01); *H04L 63/1425* (2013.01); *H04L 63/1441* (2013.01); *H04L 63/20* (2013.01)

(58) Field of Classification Search
CPC . H04L 63/1433; H04L 63/0227; H04L 63/14; H04L 63/1416; H04L 63/1425; H04L 63/1441; H04L 63/20; G06F 17/30958; G06F 21/52; G06F 21/554; G06F 21/557; G06Q 30/018; G06Q 30/0185
USPC .................................................... 726/22–25
See application file for complete search history.

(56) References Cited

U.S. PATENT DOCUMENTS

| | | | | |
|---|---|---|---|---|
| 2004/0003286 | A1* | 1/2004 | Kaler | .................... G06F 21/554 726/25 |
| 2005/0289649 | A1* | 12/2005 | Mitomo | .............. H04L 63/1416 726/22 |
| 2009/0254970 | A1* | 10/2009 | Agarwal | ............. H04L 63/1425 726/1 |

(Continued)

*Primary Examiner* — Mohammed Waliullah
(74) *Attorney, Agent, or Firm* — Garrett James O'Sullivan

(57) ABSTRACT

Multi channel distributed behavioral analysis architecture provides a software solution to the major operational challenges faced with providing an early warning system for impending cyber security events. Most cyber security events are premeditated. However, many current cyber security defense technologies only address the real-time detection of a software vulnerability, the presence of malware (known or unknown "zero day"), anomalies from pre-established data points, or the signature of an active security event. The system and method of the multi channel distributed behavioral analysis architecture introduces a technique which provides the data collection, assessment, and alerting ability prior to the occurrence of an event based on threat actor behavior.

4 Claims, 10 Drawing Sheets

(56) References Cited

U.S. PATENT DOCUMENTS

2012/0246730 A1* 9/2012 Raad ................... H04L 61/1511
                                                          726/25
2013/0055399 A1* 2/2013 Zaitsev ............... H04L 63/1416
                                                          726/25
2013/0318616 A1* 11/2013 Christodorescu ....... G06F 21/00
                                                          726/25

* cited by examiner

SYSTEM AND METHOD FOR PREDICTING IMPENDING CYBER SECURITY EVENTS USING MULTI CHANNEL BEHAVIORAL ANALYSIS IN A DISTRIBUTED COMPUTING ENVIRONMENT

CROSS REFERENCE TO RELATED APPLICATIONS

This application asserts priority from provisional application 61/972,105, filed on Mar. 28, 2014, which is incorporated herein by reference.

FIELD OF THE INVENTION

The field of the present invention relates generally to the prediction of the future security threats conducted over a distributed computer network. In particular, the field of the invention relates to a software architecture for correlating log events coupled with 3rd party attribute data over a plurality of data sources to determine the likelihood of a future event. The system is managed over a distributed computing environment, including mechanisms for managing user attributes, tokenizing personally identifiable data, risk weightings, normalizing logs, correlating data and using mathematical algorithms in order to provide a likelihood prediction with a very high level of confidence.

BACKGROUND OF THE RELATED ART

The system of the present invention is a behavioral analysis and response engine consisting of, but not limited to, 6 subparts (log collector and personally identifiable information tokenizer, rules database, threat profiling engine, dynamic network analysis engine, micro simulation/threat analysis engine, decision processor, and communication engine).

The system's methods emulate the decision-making ability of a human investigator to predict future threats. The system uses a graph based approach via semantic networks to compare event inputs across multiple logging channels against threat profiles and game theory to predict future outcomes. The system follows the structure of a traditional lexical knowledge base with nodes representing the threat descriptors and edges representing the semantic relations between them. The rules are based on known event types and given associated weights. The inference engine runs micro-simulations based on forward chaining of events where antecedents fire and assert the consequent. The knowledge base that the system relies on is the rules database. The rules are applied to the threat descriptors in the knowledge base to deduce the likelihood that a collection of threat descriptors, fired in the right sequence, will produce a future loss event.

The multi-channel distributed behavioral analysis architecture of the present invention provides a software solution to the major operational challenges faced with providing an early warning system for impending cyber security events. Most cyber security events are premeditated. However, many current cyber security defense technologies only address the real-time detection of a software vulnerability, the presence of malware (known or unknown "zero day"), anomalies from pre-established data points, or the signature of an active security event. The system and method of the invention described herein introduces a technique which provides the data collection, assessment, and alerting ability prior to the occurrence of an event based on threat actor behavior.

The system and method described herein attempts to automate many of the aspects of what a human investigator would use to collect independent data points in order to determine the likelihood of a future event, and provides an improved system and method for analyzing collected data.

Neighborhood Watch Analogy

A simple analogy that describes a basic concept of the system would be the automation of the "neighborhood watch" with improvements to this basic concept. In a neighborhood watch homeowners observe suspicious activity such as a person walking around the neighborhood that they are not familiar with. If they see an adult male walk by a neighbor's home and attempt to peer into the windows each day at 6 am for several days, then they are likely to call the neighbor and alert them and/or call the police. The person may not have taken any action to set off an alarm (i.e. they are peering from the driveway and have not attempted to come onto the property yet) but their current behavior gives a strong indication of future behavior.

The system described herein automates this manual process and provides an added advantage since it can provide an alert to the impending event before it occurs, to thereby provide a further advantage over current solutions that operate more like the alarm system on the house which will only alert when the person has taken an action to break into the house.

The system of the present invention also has the ability to detect a significant change of probability and type of event. Now, take the same scenario and add the element of a husband who leaves for work at 5:30 am and the a wife who is home alone, and the adult male walks by and takes a picture of the wife who is visible from the kitchen window in her bath robe making breakfast each morning at 6 am. The likely outcome based on the new event data has most likely changed from a potential robbery to robbery and/or assault.

The system described herein also updates the likelihood and type of event that may occur as new data is reported by the data collection engine.

FBI Investigator Analogy and Velocity of Events (Temporal Data) to alert on how soon a future event is likely to occur.

Another analogy is the process an investigator may use to profile a potential terrorist and determine the appropriate point at which enough of the right type data has been collected and the timeframe of when this data is generated [temporal] in order to make a decision on taking action [Colin Powell's 40-70% axiom is an example of the first part of this]. They may "collect the dots" by gathering data points on purchasing patterns, financial records, phone calls [to whom and where they are calling], travel history, and past criminal records. They then "connect the dots" by looking for relationships between the data points. For example, if the person has a history of communication with known terrorist groups and they've recently traveled to a known area where terrorists congregate then the investigator may begin to pay close attention to this person's next set of activities.

The temporal data in addition to the behavior data has a big effect on when the investigator may feel that they need to step in and take action. The data collected above (history of communication and recent travel to a terrorist location) may not prompt the investigator to take action to detain the suspect, but if within one week of return, the suspect received a $10,000 wire into his bank account, purchased one (1) ton of fertilizer, nitroglycerin, detonator cord, a disposable cell phone and rented a moving truck then the investigator will most likely immediately step in and detain the suspect for questioning as opposed to waiting for the next likely event to occur.

The system described herein also uses temporal data in an improved manner to determine not only what the likelihood of an event may be but when it may occur.

It is important to note that the system and method described herein distinctly differs from anomaly based behavioral detection systems in that this system is based on threat storylines and actor profiles instead of detecting the variance from predetermined data points. For example, an anomaly based detection system will report on a significant change in the number of emails sent in a given day by an actor which may or may not indicate a true threat (is it spam, a wedding/birthday invite, or holiday greeting?) which can lead to lots of false positives and gives no information regarding the actor's intent. The system described herein would not fire an alert on this behavior unless it was correlated with other events that indicated that this activity was a true threat such as a prior email from HR indicating that the employee was terminated. This system can analyze the data against threat scenarios to determine if the actor is simply updating their contact list with their new information or if the actor may be attempting to send out sensitive or derogatory information about the entity as a parting shot. This system can surmise that it would be unlikely for the employee to send out a positive mass communication after a termination (other than an address update) as opposed to an anomaly detection system which wouldn't know the difference between the two scenarios.

SUMMARY OF THE INVENTION

In accordance with the foregoing and other objectives, an aspect of the invention provides a distributed software solution for cyber threat prediction via a data processing system which is limited only by the number of central processing units capable of running predictive calculations from the data collected by the system.

Another aspect of the invention provides software architecture for associative linking of users to events and other users by partitioning the data into working units which can be processed across a distributed network of virtual hosts without losing associative context. A further aspect of the invention is to increase event processing per second throughput and overcomes latency. Another aspect of the invention implements a mathematical method ensuring a stable partitioning and processing of log data to meet the increase in session demand.

Another aspect of the invention provides multichannel threat correlation from unlike data sources. A further aspect of the invention is to normalize log data from different internal channels and tag the relationship of the data from each channel back to a source user. A further aspect of the invention is to normalize log data from different external channels and tag the relationship of the data from each channel back to the source user.

In accordance with another aspect of the invention, the software architecture has three primary components: Manager, Processors and Data Collection Agents. The manager software resides on a premise or cloud server and manages all aspects of controlling the system. Account groups, user profiles, attributes, outcomes, are created on the manager. Collection agents are distributed on the network from the management console. Collection agents are also distributed throughout the Internet to collect external data. Agents may be packaged as part of software distribution builds, as appliances that sit on the network or as SaaS nodes in the Cloud. The manager controls entity access levels. The manager controls security policies on agents and other nodes on the network. Device signatures and certificate information are imported and stored by the manager or optionally generated by the manager. The manager does performance monitoring. The manger performs auditing. Network address translation is handled by the manager for tunneled traffic from endpoints.

The collector agent software handles the collection of event data, negotiation of security keys with the management server, and tokenization of targeted data from selected netflows. Agent software can run as a SaaS offering, an embedded system process or exist as part of a client/server software package. The agent software is responsible for encrypting and decrypting communication traffic as it arrives from the clients via the server. The agent software is also responsible for discovering other elements on the network. All of the agents operate as distributed system and can share the load of data preprocessing across agent CPUs.

Other objects and purposes of the invention, and variations thereof, will be apparent upon reading the following specification and inspecting the accompanying drawings.

Figure 1:
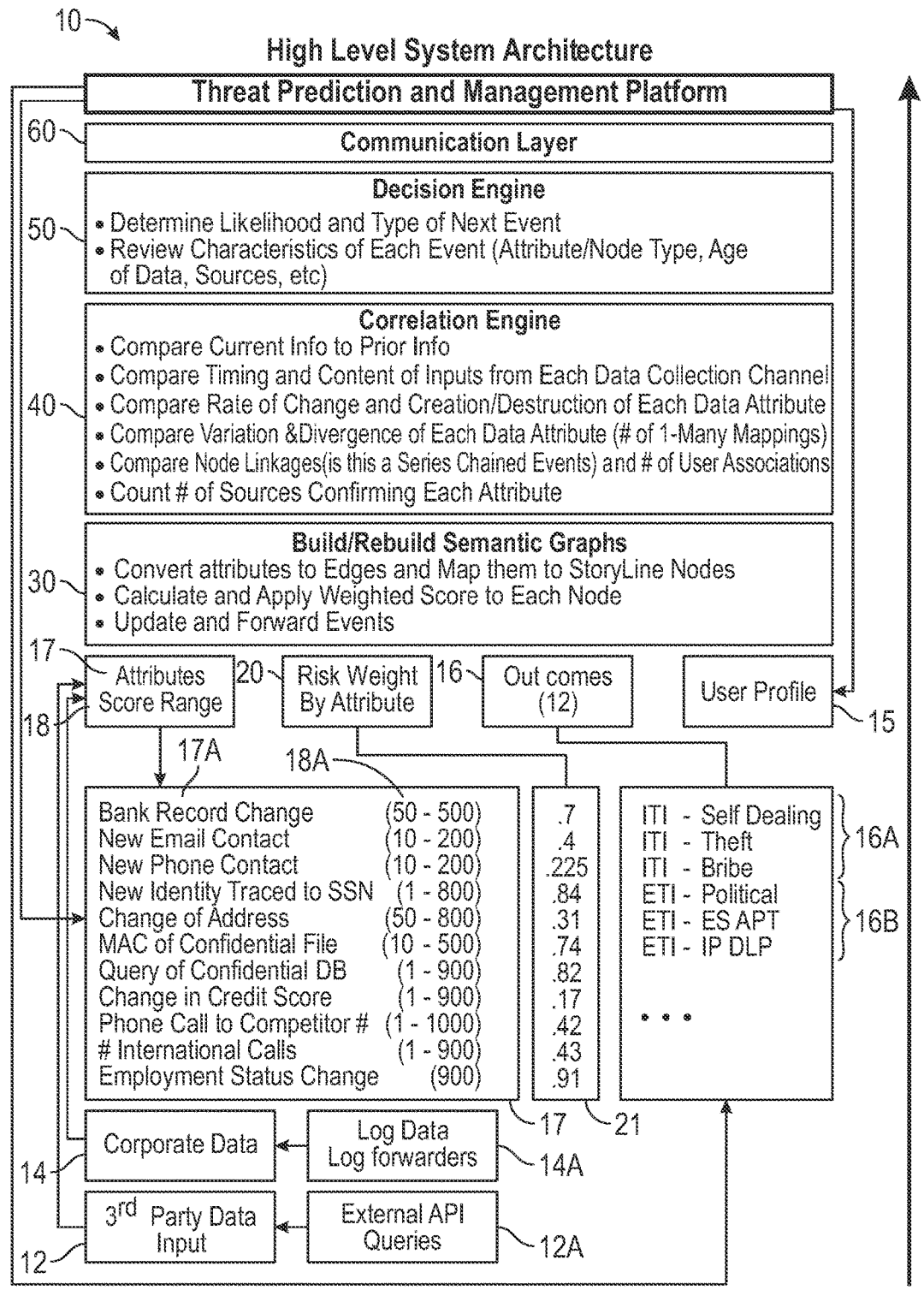
FIG. 1 is a flowchart showing the system and method of the present invention for predicting impending cyber security events using multi-channel behavioral analysis in a distributed computing environment.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Referring to FIG. 1 which shows the high level system architecture of the present invention, the invention relates to a system and method that provides a distributed software solution for cyber threat prediction via a data processing system 10 which is limited only by the number of central processing units capable of running predictive calculations from the data collected by the system. The invention provides software architecture for associative linking of users to events and other users by partitioning collected data into working units which can be processed across a distributed network of virtual hosts without losing associative context. The invention increases event processing per second throughput and overcomes latency. Further, the invention implements a mathematical method ensuring a stable partitioning and processing of log data to meet increases in session demand.

Ultimately, the system 10 provides multichannel threat correlation from unlike data sources, and normalizes log data from different internal channels and tags the relationship of the data from each channel back to a source user. Also, the system 10 further normalizes log data from different external channels and tags the relationship of the data from each channel back to the source user such that internal and external data is normalized and tagged to a source user.

The system 10 and the software architecture has three primary components: manager, processors and data collection agents. The manager software for the manager resides on a premise or cloud server and manages all aspects of controlling the system 10. Account groups, user profiles, attributes, and outcomes are created on the manager.

Data collection agents are distributed on the network from a management console as will be described further relative to FIG. 2. The data collection agents are also distributed throughout the Internet to collect external data. Agents may be packaged as part of software distribution builds, as appliances that sit on the network or as SaaS nodes in the Cloud.

Also as to the manager, the manager controls entity access levels. The manager controls security policies on agents and other nodes on the network. Device signatures and certificate information are imported and stored by the manager or optionally generated by the manager. The manager does performance monitoring. The manger performs auditing. Network address translation is handled by the manager for tunneled traffic from endpoints.

The collector agent software handles the collection of event data, negotiation of security keys with a management server, and tokenization of targeted data from selected netflows. Agent software can run as a SaaS offering, an embedded system process or exist as part of a client/server software package. The collector agent software is responsible for encrypting and decrypting communication traffic as it arrives from the clients via the server. The agent software is also responsible for discovering other elements on the network. All of the agents operate as a distributed system and can share the load of data preprocessing across agent CPUs.

In more detail as to FIG. 1, the system 10 comprises various components which are generally described hereinafter.

Management Platform Components

The components can include various data collection components, which receive input from various sources.

3rd Party Data Input 12 can be external API queries 12A, and also can include the following sources:
 OFAC, Lexis Nexis Data (state, local, federal records, 3 credit bureau header data, student records, phone records, property records, utility records, on-line records, financial institution queries, retail queries, telco queries); and
 Social Media Data (blogs, twitter, Facebook, linked in, etc).
Corporate Data 14 can include the following sources:
Corporate Data (tokenized HR records, physical security records, email records, calendar records, phone records, travel records, web browsing records, file system records, chat records, ip geolocation, login records, DB query records). This can be Log Data and Log Forwarders as indicated at 14A.

User Profiles 15 can be built by the threat prediction and management platform of the system 10 of the present invention. Profiles 15 are built on users based on corporate data 14 and 3rd party data inputs 12. The profiles 15 can be built automatically via data sampling and bound to users automatically or manually via the management platform.

Outcomes 16 are generated by the system 10. Outcomes 16 are the predicted events that are likely to occur.

Examples of Insider Threat Outcomes 16A are as follows:
 accepting third party financial, political, sexual, or other gifts in exchange for services,
 self dealing (putting self-interests above the company's),
 theft of corporate intellectual property, assets, or other proprietary information,
 obstruction or failure to act per corporate policy,
 employee revenge as a result of compensation disagreement or performance rating disagreement,
 employee discontent and related action(s) as a result of another employee's status, abilities or rewards,
 employee misuse of authority—authorizing of sales transitions (pharmaceutical sales).
Examples of External Threat Outcomes 16 are as follows:
 Increased social network activity related to named entity and/or named officers, significant investors in, or board members tied to the entity,
 development of malware with entity specific attributes (ips, urls, countermeasures for known detection and prevention tools used by entity),
 C2 (command and control) server deployment of entity specific attributes (ips, urls) to botnets,
 increased user group activity (communications and/or posting of intellectual property) related to named entity,
 changes in political and environmental conditions that may impact the entity (ex. entity has a significant investment in a firearms company and a mass shooting occurs).

Attributes 17 and an Attribute Score Range 18 are used by the system 10 (FIGS. 1 and 3), wherein each attribute 17 has an identifier 17A and a default score which falls within the score range 18 which default score is editable. As seen in FIG. 1, the attributes 17 and attribute score range 18 can include but are not limited to:
 Bank record change (50-500)
 New email contact (10-200)
 New phone contact (10-200)
 New identity traced to SSN (1-800)
 Change of address (50-800)
 MAC of confidential file (10-500)
 Query of confidential DB (1-900)
 Change in credit score (1-900)
 Phone call to competitor # (1-1000)
 # International calls (1-900)
 Employment status change (900)

Figure 3:
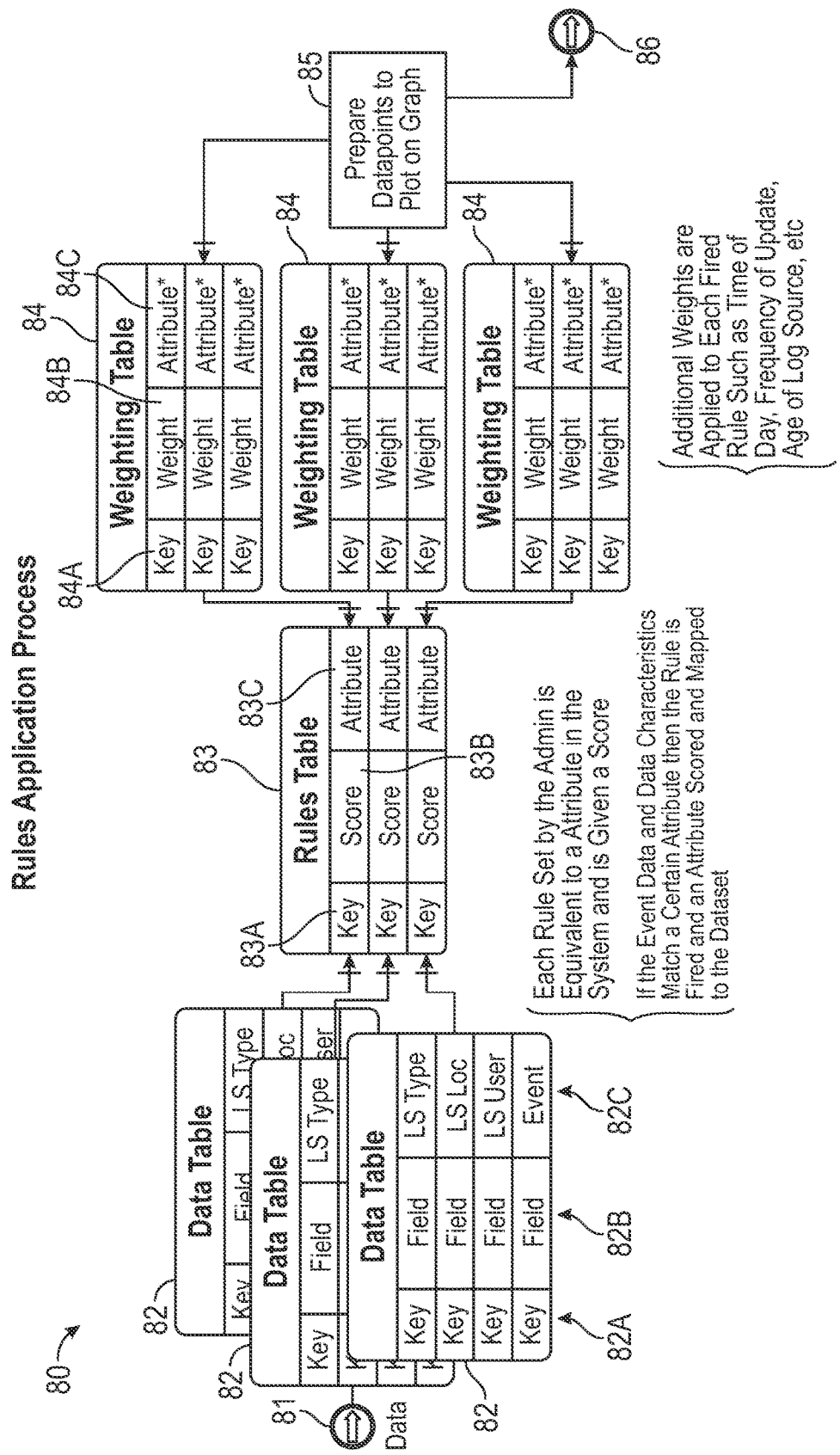
FIG. 3 is a flowchart showing a rules application process.

A Risk Weight 20 per Attribute is also assigned as seen in FIGS. 1 and 3. As to FIG. 1, each attribute 17A will have a default and user configurable setting wherein various risk weights 20 for each of the above described attributes 17A are shown in FIG. 1 in box 21. The attribute 17A will be used by a correlation engine 40 described below relative to FIG. 5 to calculate a score for each edge and node on the semantic diagram created by the system 10 later in the process.

Semantic Graph Builder 30 (FIGS. 1 and 4) is also another one of the management platform components, wherein a decision tree is built using a semantic graphing technique as described below relative to FIG. 4. The semantic graph builder 30 generally is provided to build/rebuild semantic graphs, convert attributes to edges and map them to storyline nodes, calculate and apply a weighted score to each node, and then update and forward events.

Correlation engine 40 (FIGS. 1 and 5) is another platform component which generally performs a number of functions such as: compare current info to prior info; compare timing and content of inputs from each data collection channel; compare rate of change and creation/destruction of each data attribute; compare variation and divergence of each data attribute (# of 1-many mappings); compare node linkages (is this a series chained events) and # of user associations; and count number (#) of sources confirming each attribute 17. The correlation engines are further described as follows:

Correlation Engine Functions

Linguistic correlation—compares each word/numberset in typed emails, social media postings, web searches, posted files, and phone numbers to a specific category in the threat dictionary and notes the location and number of times of occurrence over a specific period of time. It also generates a score for the number of threat dictionary items that occur together within a specific time period. Example: An actor that mentions "steal" in an email 5 times in one day will have a different score than an actor that mentions "steal" in an email 5 times in one day and dials an exchange that points to a competing entity 3 times in one day.

Weighting—verbal tense—present, past, future, present progressive, past progressive, future progressive tense will be interpreted by the engine. Example: An actor who mentions "will be taking the information" in a message will be given a higher weighting than "did take the information".

User profile risk weighting—a numerical weighting is applied based on the actors position within the entity (i.e. officer/non officer), privilege level (i.e. level of access to confidential and/or restricted data), or external to the entity (i.e. known hacker, criminal enterprise, political figure, celebrity, organizer, religious cult, fanatical organization, military figure). Other factors include age, occupations, lifestyle, and resistance ability.

Edge to node correlation—a numerical weighting that is applied based on the actor's increased risk activity as a result of related meaningful events. This is similar to the peeping, fondling, assault, rape, murder threat escalation pyramid used in FBI behavioral motive investigations. In the cyber case an example would be looking at sensitive files, discussing the contents with a competitor, negotiating a fee for access to the content, stealing the content and giving it to the competitor.

Location correlation—location of events, likely point of exfiltration.

Decision engine 50 (FIGS. 1 and 6) is another platform component which is generally provided to determine a likelihood and type of next event, and review characteristics of each event (attribute/node type, age of data, sources, etc.)

Decision Engine Functions include the following.

The purpose of this engine 50 is to evaluate the event data that is provided by the correlation engine 40 to determine the likelihood of a threat outcome. The semantic tree is passed to the decision engine 50 with the scores at each node based on the outputs from the correlation engine 40. A micro simulation engine runs through various threat modeling scenarios by traversing the decision tree and generates next node probability scores tied to the characterization, age of data from each source, and sequencing of each scenario.

Attempts to preclude observation of events are detectable. While traversing the tree the system will look at the characteristics of each event and among groups of events to look for evidence of staging of other events to obfuscate the true event. One or more outcomes are predicted and sent to the communication engine 60 to alert authorized parties of the likelihood of the upcoming event(s).

Figure 9:
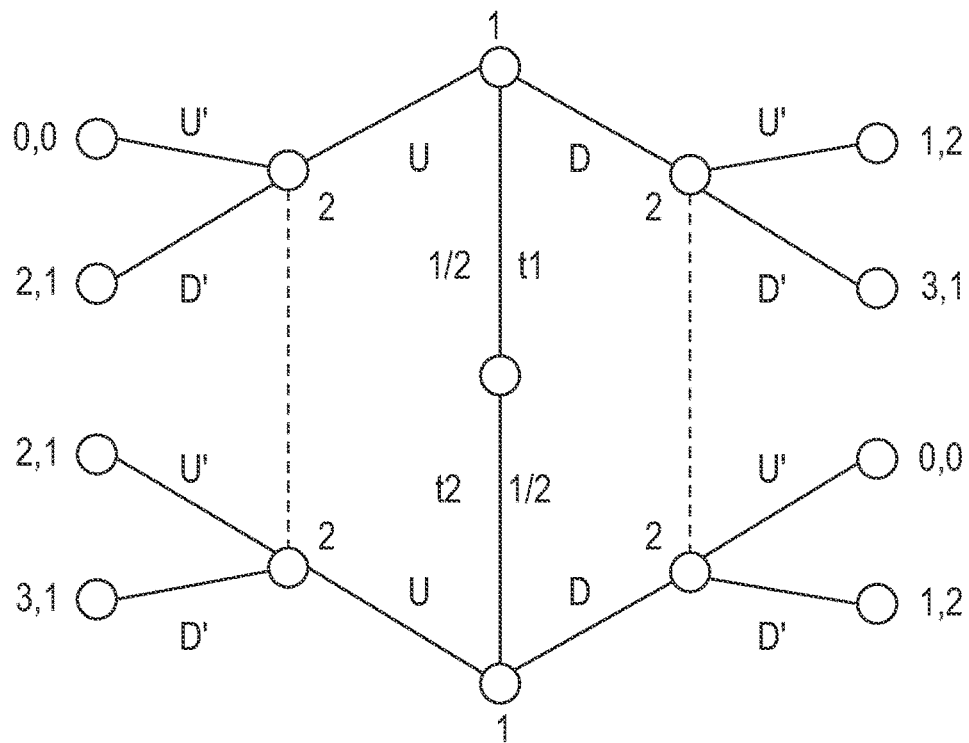
FIG. 9 diagrammatically illustrates an example of game theory.

The extensive form of sequential game theory is used with imperfect information about prior actions along a finite time axis. An example of such game theory is shown in FIG. 9.

"An extensive-form game is a specification of a game in game theory, allowing (as the name suggests) explicit representation of a number of important aspects, like the sequencing of players' possible moves, their choices at every decision point, the (possibly imperfect) information each player has about the other player's moves when he makes a decision, and his payoffs for all possible game outcomes. Extensive-form games also allow representation of incomplete information in the form of chance events encoded as "moves by nature".

The platform components also include the communication layer or communication engine 60. The basic purpose is to communicate findings to a management console, and the communication layer 60 may send alerts to multiple recipients via email, voice (AVR), text, chat, and secure in-app messaging.

Figure 2:
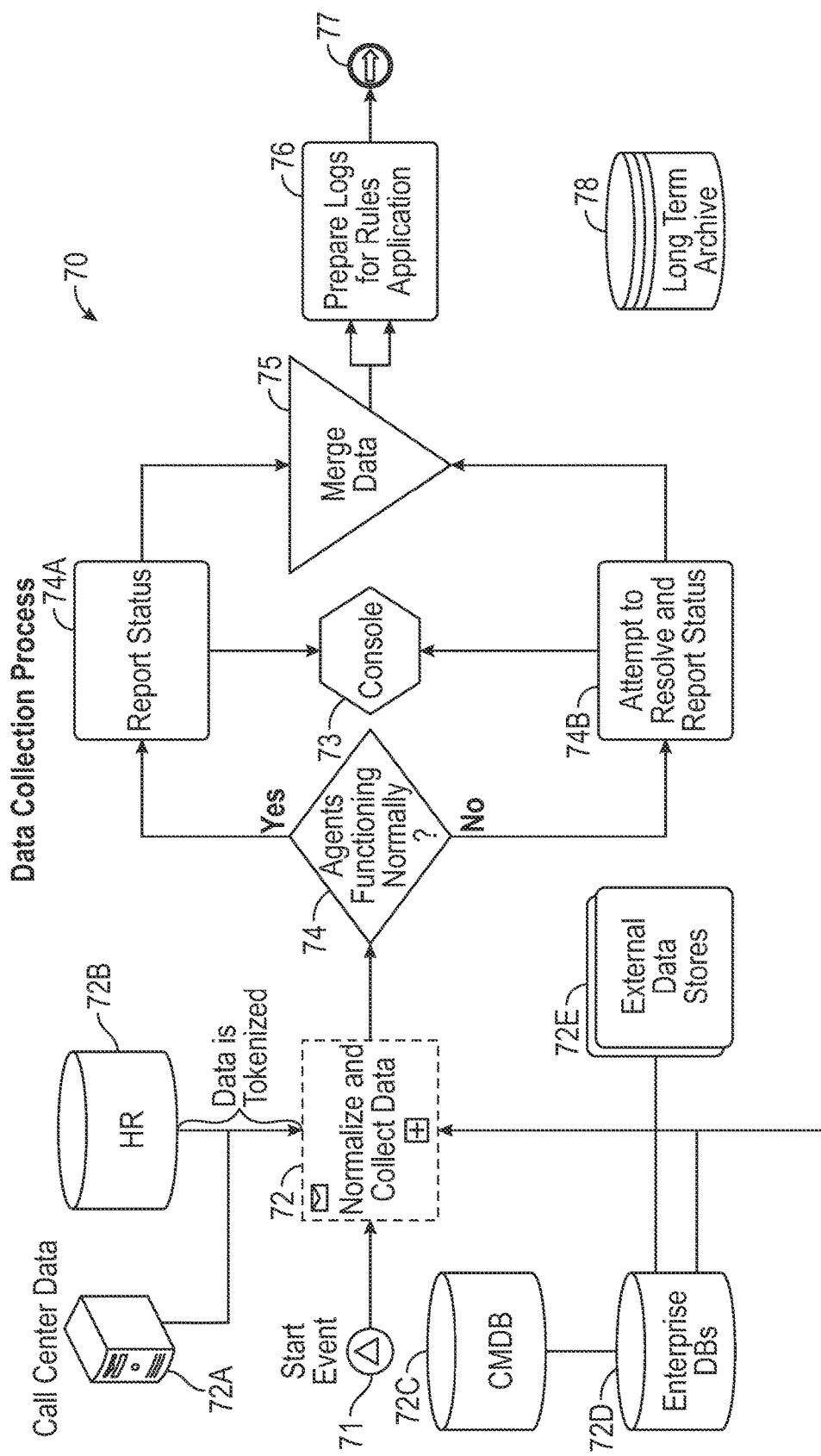
FIG. 2 is a flowchart showing a data collection process of the present invention.
Figure 2:
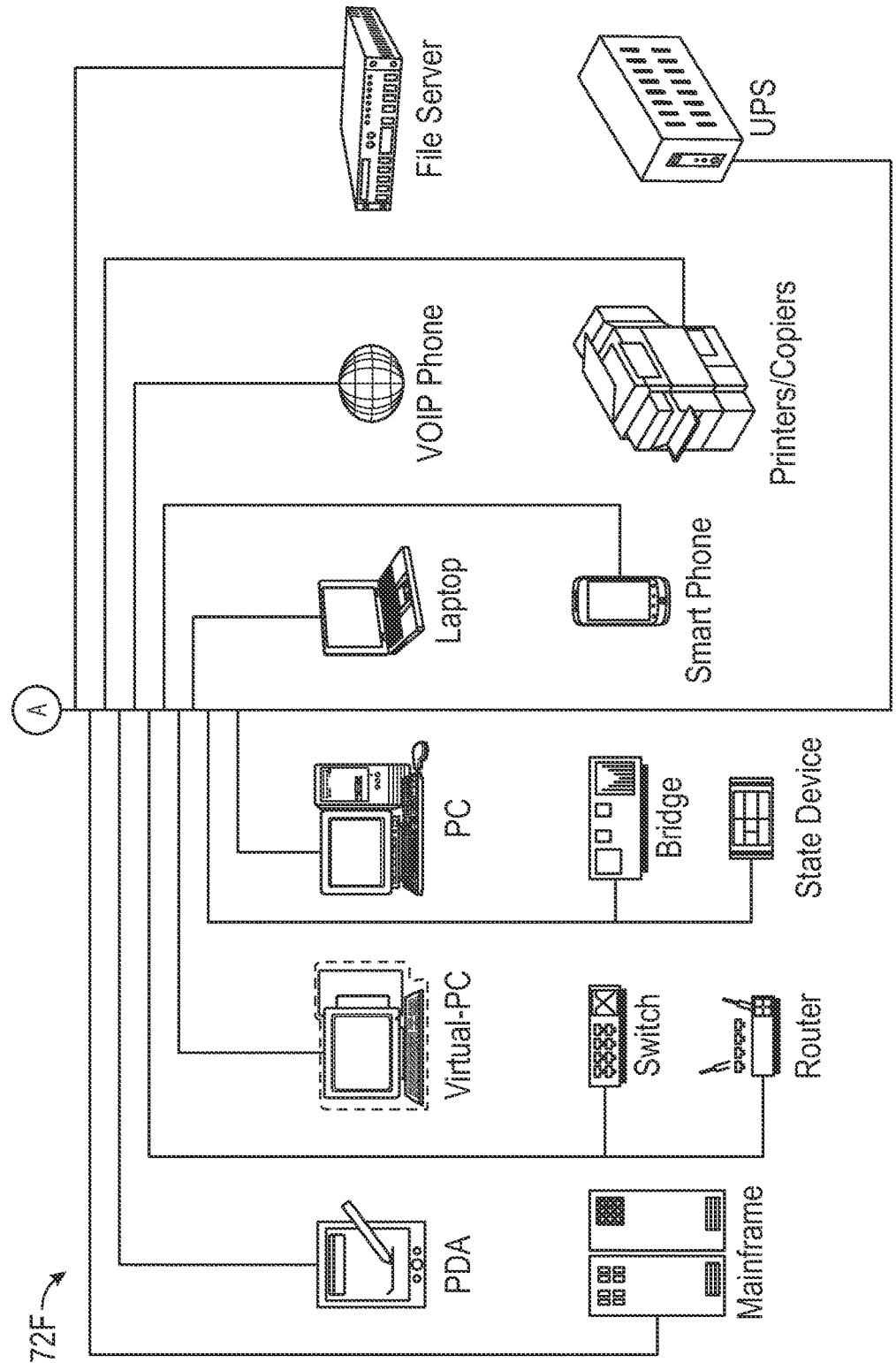

In more detail as to FIG. 2, this figure illustrates the data collection process 70, which generally collects the internal data which may be the corporate data 14 and external data which may be the $3^{rd}$ party data 12. This process uses computer hardware such as processors and computer storage media along with software operated by such hardware to collect the internal and external data for use by the system 10. Various types of such hardware and software may be used as described in more detail herein.

Generally, the data collection process 70 begins at a start event 71 wherein the system 10 will normalize and collect data 72. This step may receive various types of data from various types of data sources such as call center data 72A, HR data 72B, wherein such data is tokenized, CMCB 72C, enterprise databases (DBs) 72D, external data stores 72E, and various other types of computer hardware 72F such as: a PDA, virtual PC, PC laptop, VoIP phone, File Server, Mainframe, Switch Router, Bridge, Slate Device, Smart Phone, and Printers/Copiers.

The system 10 includes console 73 and performs the step 74 performing the query of "Agents Functioning Normally?" which may be answered with either "yes" to generate a Report Status 74A that is communicated to the console 73, or "no" which effects an Attempt to Resolve and Report Status 74B that also is communicated to the console 73.

The data collection process 70 then includes the Merge Data step 75, and Prepares Logs for Rules Application at step 76 for subsequent communication 77 to the Rules Application Process 80 described in FIG. 3. The data collection process 70 also may include a Long Term Archive 78 which includes computer readable storage media for the storage of collected data, and any other data associated with the data collection process 70.

The rules application process 80 of FIG. 3 is then performed to process the communicated data 77 received at step 81. The data is formatted in data tables 82 which may comprises columns for keys 82A and fields 82B associated with a third column 82C for the log source LS comprising LS Type, LS Loc, LS User and Event.

These data tables 82 are then processed with the Rules Table 83 which evaluates the data tables with information based upon Key 83A, Score 83B and Attribute 83C. Each rule that is set by the admin is equivalent to an attribute in the system and given a score. If the event data and data characteristics match a certain attribute then the rule is fired and an attribute scored and mapped to the dataset. The data is then passed to Weighting Tables 84 which comprise information based upon Key 84A, Weight 84B and Attribute 84C. Additional Weights are applied to each fired rule such as time of day, frequency of update, age of log source, etc.

The next step 85 is to Prepare Datapoints to Plot on Graph which data points are communicated at step 86.

Figure 4:
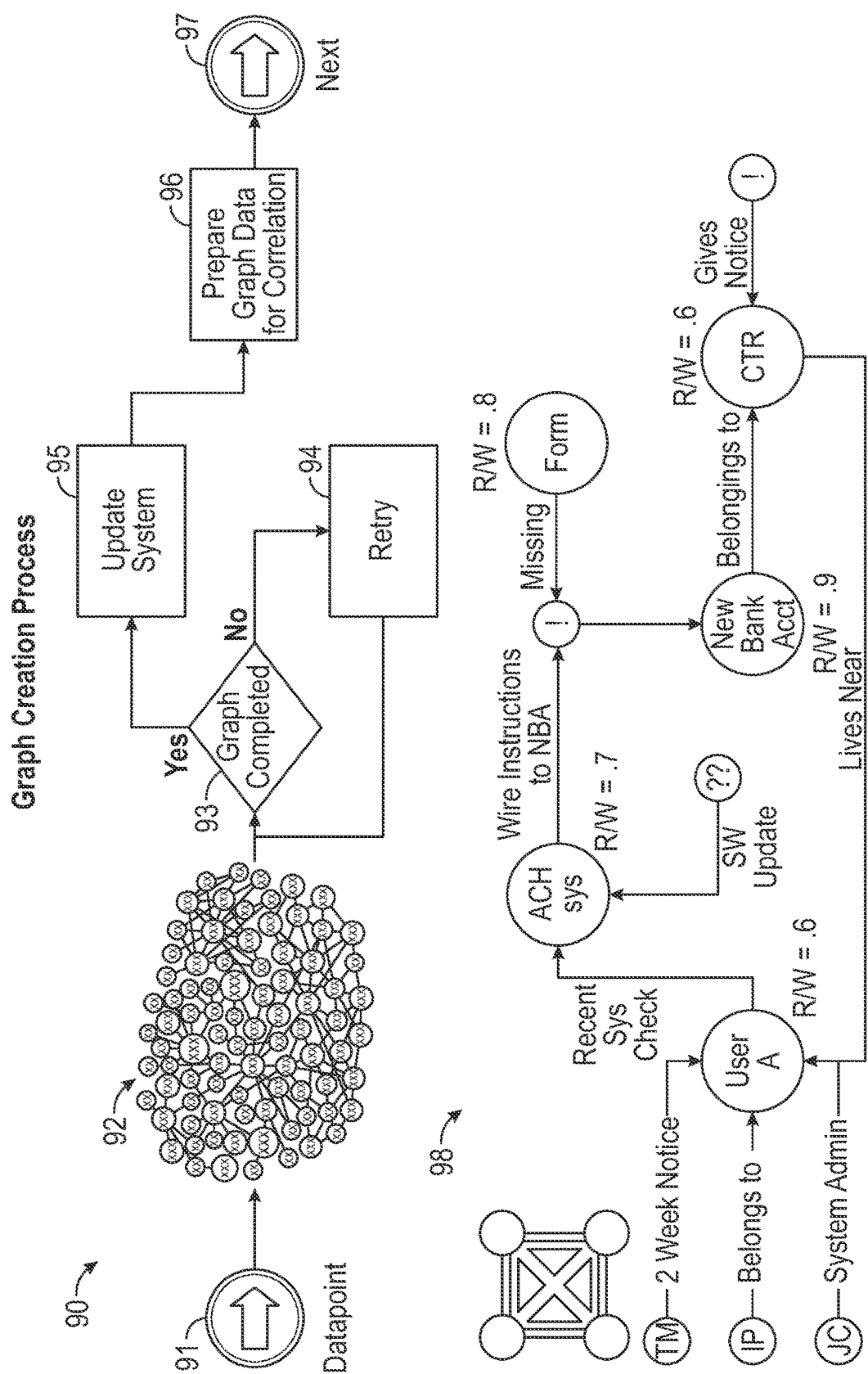
FIG. 4 is a flowchart showing a graph creation process.

In the graph creation process 90 of FIG. 4, the data points are received at step 91 for building of semantic graphs. The graph is created at step 92 wherein the attributes are converted to edges and mapped to storyline nodes. Also, this process calculates applies weighted scores to each node. The process 86 queries whether the graph is completed at step 93. If no, then Retry 94 is performed and if yes, Update System 95 is performed. The step 96 of Prepare Graph Data for Correlation is then performed before communicating this information in step 97 to the correlation engine 40 and the event correlation process 100 of FIG. 5. The lower section of FIG. 4 shows an example 98 for User A and the edges and nodes associated therewith.

Figure 5:
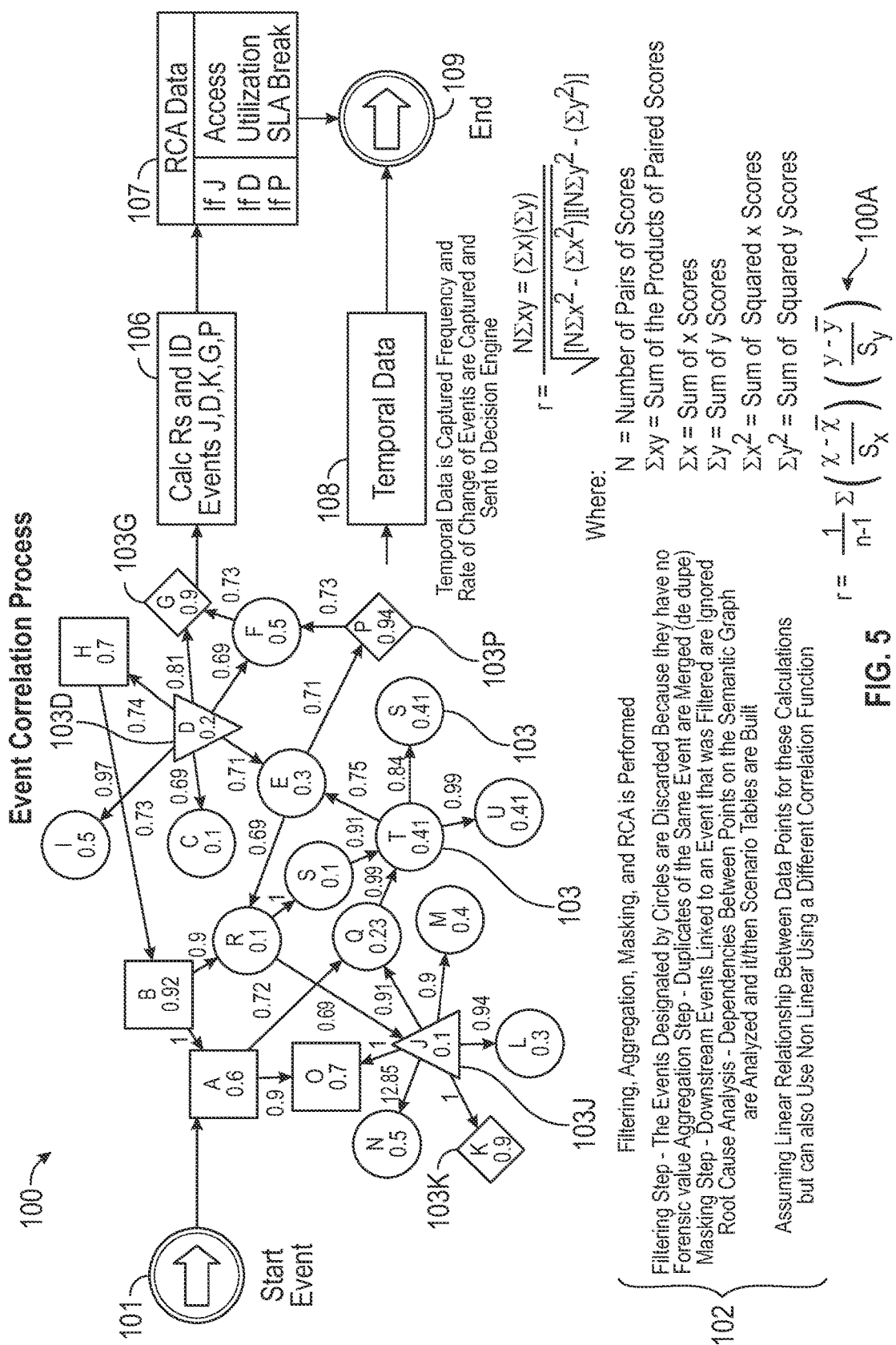
FIG. 5 is a flowchart showing an event correlation process.

Referring to the event correlation process 100 of FIG. 5, the graph data is received at step 101 and the steps of filtering, aggregating, masking and RCA (Root Cause Analysis) is performed on the nodes and edges of the illustrated graph at process section 102. In the filtering step, the events designated by circles 103 are discarded because they have no forensic value. In the aggregation step, duplicates of the same event are merged (de duped). In the masking step, downstream events linked to an event that was filtered are ignored. In step 106, call Rs and ID Events such as J 103J, D 103D, K 103K, G 103G, P 103P. In the root cause analysis step, dependencies between points on the semantic graph are analyzed and if/then scenario tables 107 are built. Preferably, this process assumes linear relationships between data points for these calculations but the system can also use non-linear relationships using a different correlation function.

Figure 6:
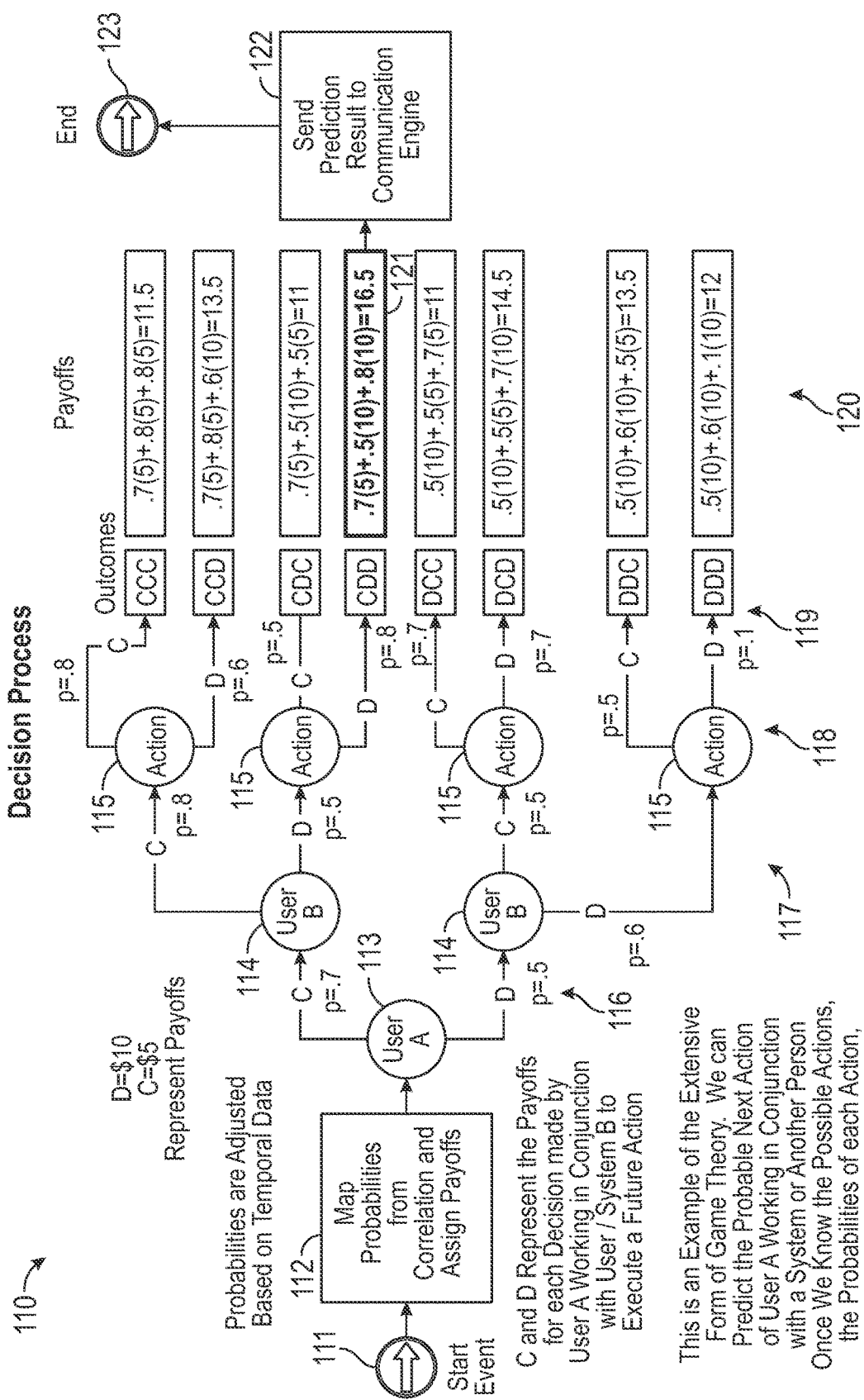
FIG. 6 is a flowchart showing a decision process.

In step 108, Temporal Data is captured and frequency and rate of change of events are captured and sent to the decision engine 50, wherein data is communicated at step 109 as described relative to the Decision Process of FIG. 6. This process 100 uses the formula 100A.

Next as to FIG. 6, the decision process 110 is illustrated. This process receives the correlation process data at step 111, and maps probabilities from correlation and assign payoffs at step 112. Probabilities are adjusted based on temporal data. For example, C and D represent the payoffs for each decision made by the User A 113 working conjunction with User/System B 114 to execute a future Action 115. In this example, D=$10 and C=$5 to represent the payoffs. This is an example of the extensive form of game theory. We can predict the probable next action of User A 113 working in conjunction with a system or another person once we know the possible actions, the probabilities of each action and the payoffs.

In more detail, there are different probabilities at different levels 116, 117 and 118 which creates multiple possible outcomes 119. By multiplying the payoffs and probabilities for each of the levels 116, 117 and 118 and adding the possible payoffs, a final payoff 120 is calculated for each of the potential outcomes 119. The highest payoff 120 calculated at box 121 may then be used to form a prediction, wherein the process 110 will perform step 122 to Send Prediction Result to Communication Engine 60 at step 123.

Figure 7:
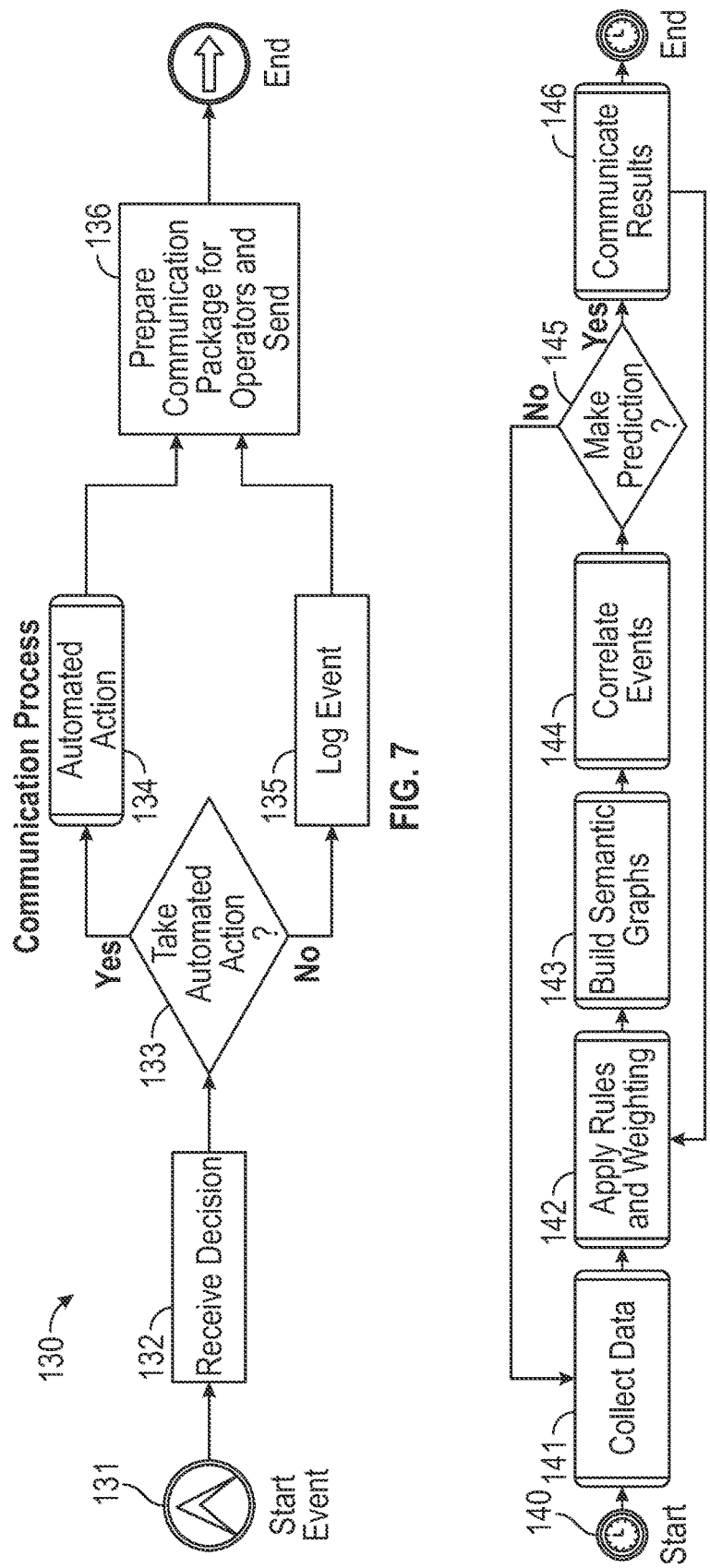
FIG. 7 is a flowchart showing a communication process.

Referring to the communication process 130 of FIG. 7, the communication process 130 receives the prediction data at step 131 so to perform the step of Receive Decision at step 132. The query of Take Automated Action 133 is performed and if yes, Automated Action 134 may be performed, and if no, Log Event 135 may be performed. Thereafter, the step 136 is performed which serves to Prepare Communication Package for Operation and Send.

Figure 8:
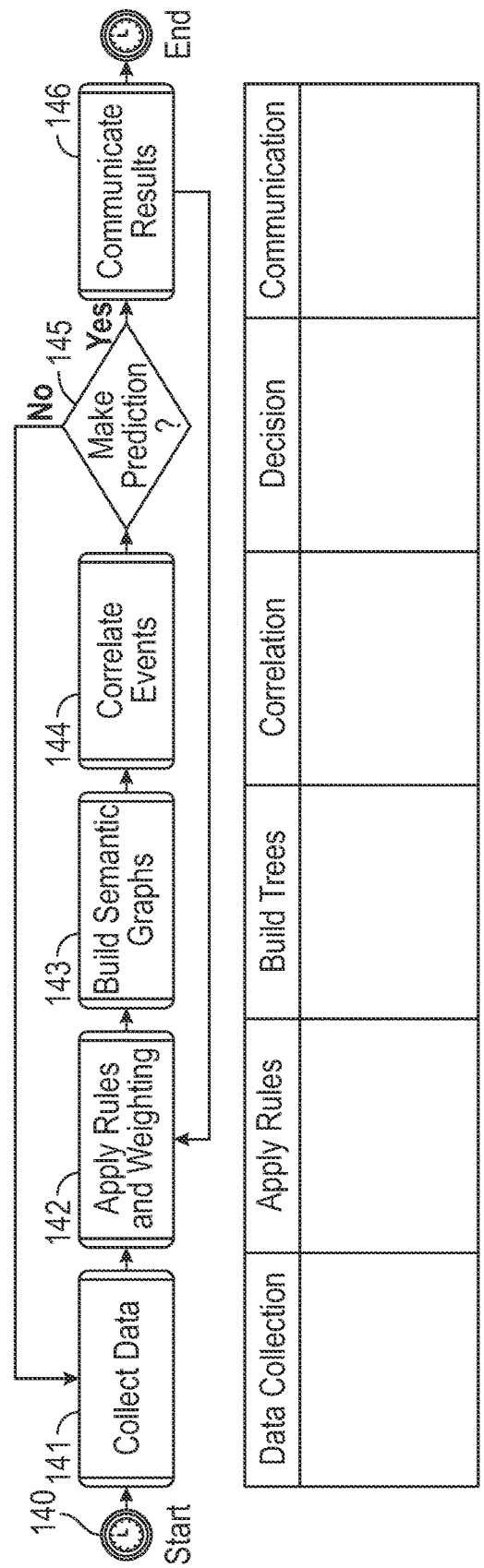
FIG. 8 is a flowchart showing the process.

FIG. 8 further illustrates the system 10 of the present invention. In accord with the disclosure herein, the inventive method starts at 140 to first Collect Data 141 with Data Collection Process 70, Apply Rules and Weighting 142 with the Rules Application Process 80, Build Semantic Graphs 143 with Graph Creation Process 90, Correlate Events 144 with Event Correlation Process 100, Make Prediction 145 with Decision Process 110, and if yes there is a prediction, Communicate Results 146 with Communication Process 130. If there is no prediction at step 145, the system 10 and its process may return to Collect Data 141. After communicating results at step 146, the system and method also continuously apply rules and weighting at step 142 to continuously monitor events.

Generally then, the system 10 of the present invention relate to a software architecture for predicting the likelihood future security threats in distributed computing environment, which may comprise: a registration entity or registry residing within a main server entity; a communication engine to communicate with said main server and authorized $3^{rd}$ parties; one or a plurality of decision engines and entities communicating with said main server; one or a plurality of correlation engines and entities communicating with said main server and decision engines; one or a plurality of semantic graph build engines communicating with said correlation entities; one or a plurality of distributed networked agents providing a mechanism for collecting event and attribute data for said main server entity, correlation server entity, and decision entity; and a defined protocol for initiating and maintaining secure communication between the main server, agents, correlation engines, decision engines and communication server over said network.

The system 10 may further comprise means for forecasting the arrival time of the impending event(s) by incorporating temporal data in the prediction process; means for discovering said agent servers; means for determining an available processing bandwidth of the main server, agents, decision engines, and correlation engines; means for registering said main server and available agent server with said registration entity; means for correlating event and attribute data from unstructured data sources; means for collecting log data; means for normalizing and tokenizing log data; means for generating semantic graphs of log and attribute data; and means for deciding on the likelihood of an event using the extensive form of sequential game theory.

Still further, the system for deciding on the likelihood of an event using the extensive form of sequential game theory may comprise additional capabilities of: means for discovering attempts to hide the observation of events by staging other events; means for discovering attempts to hide the observation of events by utilizing a plurality of communications channels to execute an attack; and means for making predictions in the event of partial data loss.

Furthermore, the system may function for distributing workload and may comprise the additional capabilities of: means for breaking data analysis work across an virtually unlimited amount cpu cores in order to scale data processing to handle an unlimited amount or log and attribute data; means for shifting workload in the event of a catastrophic loss of processing agents with minimal loss of fidelity; means for auto provisioning of processing agents as bandwidth, log and processing demands increase or decrease.

Additionally, the system for collecting data may comprise the additional capabilities of means for self-healing databases while still processing transactions due to a security attack, a loss/addition of one or more virtual machine cores, a memory/disk buffer overwrite, a major shift in workload, or a hardware failure.

The following provides a description of a more detailed example of the system.

Unpacking each step.

Collection of log data (step 1). This is an example of the data collection process 70 of FIG. 2.

Enable log server and log client and begin collection of logs.

Log Server

1) Enable syslogd on host A. Host A will serve as the log collection server. Syslogd is a FreeBSD native tool that allows for centralized file aggregation, merging, and rotation.

a) edit/etc./syslog.conf

A log server is a system that has been configured to accept logging information from other hosts. Before configuring a log server, check the following:

If there is a firewall between the logging server and any logging clients, ensure that the firewall ruleset allows UDP port 514 for both the clients and the server.

The logging server and all client machines must have forward and reverse entries in the local DNS. If the network does not have a DNS server, create entries in each system's /etc./hosts. Proper name resolution is required so that log entries are not rejected by the logging server.

On the log server, edit /etc./syslog.conf to specify the name of the client to receive log entries from, the logging facility to be used, and the name of the log to store the host's log entries. This example adds the hostname of B, logs all facilities, and stores the log entries in /var/log/logclient.log.

Sample Log Server Configuration File

+logclient.example.com*.* /var/log/logclient.log

When adding multiple log clients, add a similar two-line entry for each client.

b) Next configure /etc./rc.conf 1 syslogd_enable="YES"

2 syslogd_flags="-a logclient.example.com -v -v"

The first entry starts syslogd at system boot. The second entry allows log entries from the specified client. The -v -v increases the verbosity of logged messages. This is useful for tweaking facilities as administrators are able to see what type of messages are being logged under each facility.

Multiple -a options may be specified to allow logging from multiple clients. IP addresses and whole netblocks may also be specified c) Finally create the log file 1 #touch /var/log/logclient.log Restart syslogd and verify that it is running 1# service syslogd restart 2 # pgrep syslog Log Client A logging client sends log entries to a logging server on the network. The client also keeps a local copy of its own logs.

Once a logging server has been configured, edit /etc./rc.conf on the logging client:

a) edit /etc./rc.conf on the logging client syslogd_enable="YES"

syslogd_flags="-s -v -v"

The first entry enables syslogd on boot up. The second entry prevents logs from being accepted by this client from other hosts (-s) and increases the verbosity of logged messages.

Next, define the logging server in the client's /etc./syslog.conf. In this example, all logged facilities are sent to a remote system, denoted by the @ symbol, with the specified hostname:

*.* @logserv.example.com

After saving the edit, restart syslogd for the changes to take effect:

service syslogd restart logger is a native tool on FreeBSD that provides a shell command interface to the syslog module. It allows the user to create log entries on the local host and have them sent to the log server To test that log messages are being sent across the network, use logger on the client to send a message to syslogd:

c) # logger "Test message from logclient"

This message should now exist both in /var/log/messages on the client and /var/log/logclient.log on the log server.

Encrypting log traffic using stunnel wrapper

Server setup (host A from above)

1) Install stunnel package, rsyslogd, and OpenSSL if it is not already installed on your *Nix system.

2) On the host A(server) create a certificate using OpenSSL openssl req -new -x509 -days 3650 -nodes -out stunnel.pem -keyout stunnel.pem 3) Create a configuration file for stunnel

Certificate/key is needed in server mode cert=/etc./stunnel/stunnel.pem

Some debugging stuff useful for troubleshooting debug=7 foreground=yes

[ssyslog]

accept=60514 connect=61514

Save this file to /etc./stunnel/syslog-server.conf

Start the stunnel deamon 4) stunnel4/etc./stunnel/syslog.server.conf.

Now, configure rsyslog to do everything you want. If in doubt, you can simply copy /etc./syslog.conf to /etc./rsyslog.conf, and you probably have what you want. The really important thing in rsyslogd configuration is that you must make it listen to TCP port 61514 (remember, this is where stunnel sends the messages). Add "-t 61514" to the rsyslogd startup options in your system startup script. Then start (or restart) rsyslogd.

The server should be fully operational

Client setup (host b)

1) Create client configuration file

Some debugging stuff useful for troubleshooting debug=7 foreground=yes client=yes

[ssyslog]

accept=127.0.0.1:61514 connect=logserv.example.com: 60514

The most important difference from the server configuration outlined above is the "client=yes" directive. It is what makes this stunnel behave like a client. The "accept" directive binds stunnel only to the local host, so it is protected from receiving messages from the network (somebody might fake being the local sender). The address "logserv.example.com" is the address of the server machine 2) Save this file to /etc./stunnel/syslog-client.conf.

3) Start stunnel via "stunnel4 /etc./stunnel/syslog-client-.conf". You should see some startup messages. If no errors appear, you have a running client stunnel instance.

4) Finally, you need to tell rsyslogd to send data to the remote host. In stock syslogd, you do this via the "@host" forwarding directive. The same works with rsyslog, but it supports extensions to use TCP. Add the following line to your /etc./rsyslog.conf:

*?* @@127.0.0.1:61514

Please note the double "at" signs (@@). This is not a typo. It tells rsyslog to use TCP instead of UDP delivery. In this example, all messages are forwarded to the remote host. Obviously, you may want to limit this via the usual rsyslog.conf settings (if in doubt, man rsyslog.conf).

You do not need to add any special startup settings to rsyslog on the client. Start or restart rsyslog so the new configuration settings take place.

Test that logs are going over an encrypted tunnel

Figure 10:
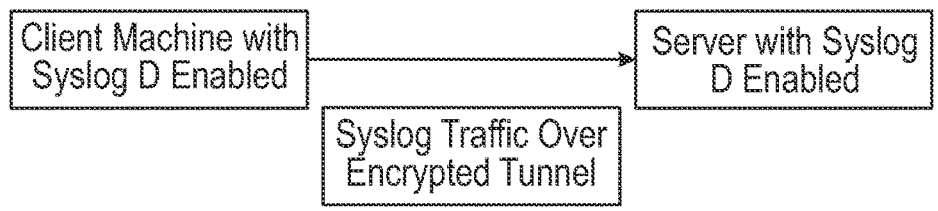
FIG. 10 is flowchart showing the syslog process.

On client machine type logger "Secure test message from logclient" in accord with the flowchart of FIG. 10.

```
Format of Sys Log Message (RFC5424)
SYSLOG-MSG       = HEADER SP STRUCTURED-DATA [SP
                   MSG]
HEADER           = PRI VERSION SP TIMESTAMP SP
                   HOSTNAME
                   SP APP-NAME SP PROCID SP MSGID
PRI              = "<" PRIVAL ">"
PRIVAL           = 1*3DIGIT ; range 0 .. 191
VERSION          = NONZERO-DIGIT 0*2DIGIT
HOSTNAME         = NILVALUE / 1*255PRINTUSASCII
APP-NAME         = NILVALUE/ 1*48PRINTUSASCII
PROCID           = NILVALUE / 1*128PRINTUSASCII
MSGID            = NILVALUE / 1*32PRINTUSASCII
TIMESTAMP        = NILVALUE / FULL-DATE "T" FULL-TIME
FULL-DATE DATE   = FULLYEAR "-" DATE-MONTH "-"
                   DATE-MDAY
DATE-FULLYEAR    = 4DIGIT
DATE-MONTH       = 2DIGIT ; 01-12
DATE-MDAY        = 2DIGIT ; 01-28, 01-29, 01-30, 01-31 based on
                   ; month/year
FULL-TIME        = PARTIAL-TIME TIME-OFFSET
PARTIAL-TIME     = TIME-HOUR ":" TIME-MINUTE
                   TIME-SECOND
                   [TIME-SECFRAC]
TIME-HOUR        = 2DIGIT ; 00-23
TIME-MINUTE      = 2DIGIT ; 00-59
TIME-SECOND      = 2DIGIT ; 00-59
TIME-SECFRAC     = "." 1*6DIGIT
TIME-OFFSET      = "Z" / TIME-NUMOFFSET
TIME-NUMOFFSET   = ("+" / "-") TIME-HOUR   TIME-MINUTE
STRUCTURED-DATA  = NILVALUE / 1*SD-ELEMENT
SD-ELEMENT       = "[" SD-ID *(SP SD-PARAM) "]"
SD-PARAM         = PARAM-NAME "=" %d34 PARAM-VALUE
                   %d34
SD-ID            = SD-NAME
PARAM-NAME       = SD-NAME
PARAM-VALUE      = UTF-8-STRING ; characters ' " ', '\' and
                   ; ']' MUST be escaped.
SD-NAME          = 1*32PRINTUSASCII
                   ; except '=', SP, '|', %d34 ('")
MSG              = MSG-ANY / MSG-UTF8
MSG-ANY          = *OCTET ; not starting with BOM
MSG-UTF8         = BOM UTF-8-STRING
BOM              = %xEF.BB.BF
UTF-8-STRING     = *OCTET ; UTF-8 string as specified
                   ; in RFC 3629
OCTET            = %d00-255
SP               = %d32
PRINTUSASCII     = %d33-126
NONZERO-DIGIT    = %d49-57
DIGIT            = %d48 / NONZERO-DIGIT
NILVALUE         = "-"
```

The PRI value (priority value) can be one of the following"

| Numerical Code | Facility |
|---|---|
| 0 | kernel messages |
| 1 | user-level messages |
| 2 | mail system |
| 3 | system daemons |
| 4 | security/authorization messages |
| 5 | messages generated internally by syslogd |
| 6 | line printer subsystem |
| 7 | network news subsystem |
| 8 | UUCP subsystem |
| 9 | clock daemon |
| 10 | security/authorization messages |
| 11 | FTP daemon |
| 12 | NTP subsystem |
| 13 | log audit |
| 14 | log alert |
| 15 | clock daemon (note 2) |
| 16 | local use 0 (local0) |
| 17 | local use 1 (local1) |
| 18 | local use 2 (local) |
| 19 | local use 3 (local3) |
| 20 | local use 4 (local4) |
| 21 | local use 5 (local5) |
| 22 | local use 6 (local6) |
| 23 | local use 7 (local7) |

Each message Priority also has a decimal Severity level indicator. These are described in the following table along with their numerical values. Severity values MUST be in the range of 0 to 7 inclusive.

| | |
|---|---|
| 0 | Emergency: system is unusable |
| 1 | Alert: action must be taken immediately |
| 2 | Critical: critical conditions |
| 3 | Error: error conditions |
| 4 | Warning: warning conditions |
| 5 | Notice: normal but significant condition |
| 6 | Informational: informational messages |
| 7 | Debug: debug-level messages |

The Priority value is calculated by first multiplying the Facility number by 8 and then adding the numerical value of the Severity. For example, a kernel message (Facility=0) with a Severity of Emergency (Severity=0) would have a Priority value of 0. Also, a "local use 4" message (Facility=20) with a Severity of Notice (Severity=5) would have a Priority value of 165. In the PRI of a syslog message, these values would be placed between the angle brackets as <0> and <165> respectively. The only time a value of "0" follows the "<" is for the Priority value of "0". Otherwise, leading "0"s MUST NOT be used.

Certain types of functions are performed at each conceptual layer:

An "originator" generates syslog content to be carried in a message.

A "collector" gathers syslog content for further analysis.

A "relay" forwards messages, accepting messages from originators or other relays and sending them to collectors or other relays.

A "transport sender" passes syslog messages to a specific transport protocol.

A "transport receiver" takes syslog messages from a specific transport protocol.

Diagram 1 shows the different entities separated by layer.

Diagram 1. Syslog Layers

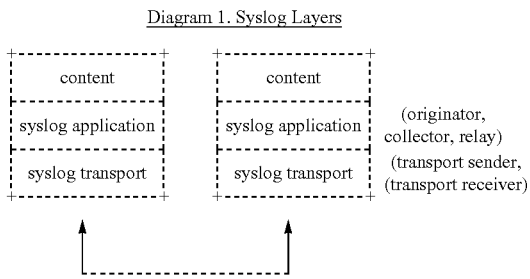

Rules application process (Step 2); This is an example of the rules appliction process 80 of FIG. 3.

Now that we have unpacked the process to collect the syslogs lets describe the beginnings of the behavioral prediction process.

a) Collecting the dots, which is part of the data collection process 70.

Let's start with the scenario:

An M&A department employee is given a termination notice on 10 Oct. 2013.

The event is logged in the HR application and sends a syslog event to the log server.

On October 11 the employee Googles a known competitor's website and navigates the page that contains the contact info of an M&A senior executive.—A webserver CRL event is sent to the syslog server logging each page visited On October 11 the employee dials that competitor from his office phone. The VOIP server sends a syslog to the syslog server with the originating number, the phone number dialed, and duration of call On October 11 the user to logs into the pending M&A actions database and is successful What we want the system to do is to determine the likelihood that these four authorized events will likely lead to a breach and to alert on it. A log alerting tool would not alert on these events since they are all authorized and independently do not appear out of the ordinary.

Here are the contents of the 7 syslog packets.

On October 10

Syslog Packet A—HR App syslog [created after HR rep enters termination action in HR app]

<165>1 2013-10-10T22:14:15.003Z hrmachine.example.com evntslog—ID47 [exampleSDID@32473 iut="3" eventSource="HR application" eventID="1011"] [examplePriority@32473 class="high"]—termination action for employeeID 14567 effective on 2013-24-10T00:00:00.000Z In this example, the VERSION is 1 and the Facility has the value of 4. The Severity is 2. The message was created on 10 Oct. 2013 at 10:14:15 pm UTC, 3 milliseconds into the next second. The message originated from a host that identifies itself as "hrmachine.example.com". The APP-NAME is "HR application" and the PROCID is unknown. Th MSGID is "ID47". The MSG is termination action for employeID 14567 effective on 2013-24-10T00:00:00.000Z, encoded in UTF-8. STRUCTURED-DATA, two elements with values "[exampleSDID@32473 iut="3" eventSource="HR application" eventID="1011"] and[examplePriority@32473 class="hiegh"]

On October 11

Syslog Packet B—Logon success message created with STRUCTURED-DATA on

<165>1 2013-11-10T22:14:15.003Z mandamachine.example.com evntslog—ID47 [exampleSDID@32473 iut="3" eventSource="M&A application" eventID="1013"] [examplePriority@1000 class="high"]—logon success for employeeID 14567

In this example, the VERSION is 1 and the Facility has the value of

4. The Severity is 2. The message was created on 11 Oct. 2013 at 10:14:15 pm UTC, 3 milliseconds into the next second. The message originated from a host that identifies itself as "mandamachine.example.com". The APP-NAME is "M&A application" and the PROCID is unknown. The MSGID is "ID47". The MSG is success for userID emp14567, encoded in UTF-8. STRUCTURED-DATA, two elements with values "[exampleSDID@32473 iut="3" eventSource="M&A application" eventID="1013"] and [examplePriority@1000 class="med"]

The VOIP call consists of 4 events captured across 4 syslogs: call setup, disconnect request, call disconnect (clearing) and called number from reverse call leg.

Syslog Packet Ca—Call detail record call setup created with STRUCTURED-DATA. This is for the forward call leg <165>1 2013-11-10T22:14:15.003Z voipservermachine.example.com evntslog—ID47 [exampleSDID@32473 iut="3" eventSource="VOIP application" eventID="993"] [examplePriority@100 class="low"]- %VOIPAAA-5-VOIP CALL HISTORY: CallLegType 1, ConnectionId BA55719E F8C10015 0 1B1E08, SetupTime 22:14:15.003 Z Syslog Packet Cb—Call detail record call disconnect request created with STRUCTURED-DATA. This is for the forward call leg.

<165>1 2013-11-10T22:14:15.003Z voipservermachine.example.com evntslog—ID47 [exampleSDID@32473 iut="3" eventSource="VOIP application" eventID="993"] [examplePriority@100 class="low"]—PeerAddress 68575, PeerSubAddress, DisconnectCause 10, DisconnectText normal call clearing., ConnectTime 23:18:14.707 Z Syslog Packet Cc—Call detail record call disconnect created with STRUCTURED-DATA. This is for the forward call leg <165>1 2013-11-10T22:14:15.003Z voipservermachine.example.com evntslog—ID47 [exampleSDID@32473 iut="3" eventSource="VOIP application" eventID="993"] [examplePriority@100 class="low"]—DisconnectTime 23:18:15.003 Z Fri Oct. 11 2013, CallOrigin 2, ChargedUnits 0, InfoType 2, TransmitPackets 1509, TransmitBytes 102600, ReceivePackets 1510, ReceiveBytes 138920

Syslog Packet Cd—Call detail record call disconnect created with STRUCTURED-DATA. This is for the reverse call leg.

<165>1 2013-11-10T22:14:15.003Z voipservermachine.example.com evntslog—ID47 [exampleSDID@32473 iut="3" eventSource="VOIP application" eventID="993"] [examplePriority@100 class="low"]—PeerAddress 2125551212, PeerSubAddress, DisconnectCause 10, DisconnectText normal call clearing., ConnectTime 11:14:49.703 UTC Mon The packet capture explanation is similar to the log example above. What's important to note is that the call duration is 1 h 04 min, the calling extension is 68575 which belongs to employee 14567 and the destination number is 212551212 (reverse call leg) to a competitor.

Syslog Packet D—Browsing page loaded success message created with STRUCTURED-DATA on.

<165>1 2013-11-10T22:14:15.003Z proxyservermachine.example.com evntslog—ID47 [exampleSDID@32473 iut="3" eventSource="Browser application" eventID="1011"] [examplePriority@1000 class="high"]—logon success for employeeID 14567

In this example, the VERSION is 1 and the Facility has the value of 4. The Severity is 2. The message was created on 11 Oct. 2013 at 10:14:15 pm UTC, 3 milliseconds into the next second. The message originated from a host that identifies itself as "proxyservermachine.example.com". The APP-NAME is "Browser application" and the PROCID is unknown. The MSGID is "ID47". The MSG is success for userID emp14567, encoded in UTF-8. STRUCTURED-DATA, two elements with values "[exampleSDID@32473 iut="3" eventSource="Browser application" eventID="1013"] and[examplePriority@1000 class="low"] employee visits webpage http://competitor.com/executiveteam/contact for employeeID 14567 on 2013-11-10T00:01:00.000Z 1) Packet data is extracted and copied into a sql database tables Diagram 2 shows the different entities separated by layer.

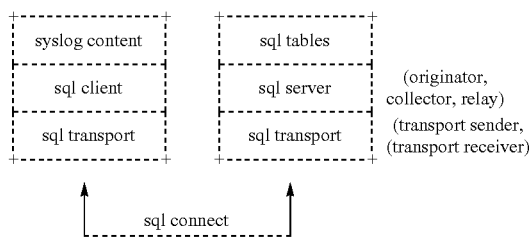

Diagram 2. Copying syslog into database records

1) Add entry to sql database for each syslog and apply scores and attributes SQL database table to collect sysqlog data and apply rules The structure of the table is a simple one that collects each syslog and stores it as a BLOB.

In addition to storing the syslog data the following 12 columns are added to the table:

a) User/Process Attribute—Used for attribution step.

This piece of Meta data is used to attribute actions to an individual or system process. This example records the id of the user/process associated with this log source record. If the record cannot be extracted from the syslog payload then it can be collected by querying a domain server (active directory for example) to get this information, it may be populated by an ETL (export, transport and load) process from a asset inventory system or it may be manually input by the administrator of the log management system.

This field can have 3 possible values (unknown=0, the id of the user, id of process)

b) Mens Rea (Possible Intent)—Used for linking log to possible user intent. At this stage the field is blank but it will be updated during future stages Possible values—we use combination formula for 7 possible reasons of intent (theft, desire, selfishness, delay/avoidance, anger/revenge, pride/hubris, envy). We don't care about the order but we do care about the number of possible drivers for the future action N!/R!(N-R)! will be used to determine the number of tests we will need to do in a later step to figure out which outcome will provide the biggest payoff for the person c) Log Source Attribute—used to identify and rate the origin of the data LSA1—ID of the log source LSA2—Age of the log source—when it was added to the system [captured as a value in milliseconds from when the first log was received]

LSA3—Location of log source—from local subnet, from internal network, or from the internet In this example the syslog header field is used to capture the timestamp and hostname LSA1=hostname from syslog header LSA2=current time minus first timestamp that log source was added to the system. The log collector agent will maintain a hash table (of 1-10 million devices depending on memory constraints of the hardware the system is running on). If the system becomes unstable or is restarted then the collector will reload the hash table from a Sql table that maintains the original timstamp and id of the log sources added by the system.

LSA3=Origin of log source. Collector will use DNS TCP/IP table to determine if the sender is on the same subnet or network. If it cannot determine this information then it will list it mark it as unknown. If the collector has access to a network discovery tool that exposes an API to query device information then it will perform a query using the DNS or IP info of the device to attempt to determine its location relative to itself.

The 4 possible values are L=local subnet/network, N=non local subnet /network but inside firewall, E=external to network, U=unknown d) Early warning detection flag—used to identify early discrepancies in log source data. For example if the timestamp for the syslog data for that log source is before a prior recorded log then the clock on the source log machine may have been changed or the data may have been corrupted or modified in transit. This detection will also set the flag if the log source switches methods of logging such as from using a secure tunnel to a non-secure one, switching logging ports, PROCID changes, or a switching from using cryptographically signed messages to non-cryptographically signed messages[often used in replay attacks of log messages]

EWD check will do a timestamp comparison of the last log captured from LSA1. If a discrepancy is detected then the flag will be set to yes d) Weight—will be used later to determine risk weighting. For now the value is set to 1 e) DS flag=records whether the log was digitally signed or not f) ST=Tables that describe the details of the Structured data that is contained in the syslog packet by Source type. This field tells the system what table to look at in order to figure out what data to extract in the STRUCTURED-DATA portion of the syslog packet. The Structured data in a VOIP log will be different from an Apache server log which will be different from a Win2003 server log.

Each source type table contains info about the regular expressions needed to perform the proper query against the STRUCTURED DATA in the syslog along with the human readable meaning of the data returned in each Octet.

In the example below 1=VOIP event log format, 2=CLF (common log format), 3=Windows 2003 event log format, 4=Peoplesoft event log format Here's a brief description of the ST table data for the syslog packets used for this example.

For VOIP the table has this format (borrowed from Cisco VOIP logging)

| Forward Call Leg | |
|---|---|
| Time CDR generated | : Jun 18 11:15:02.867 |
| Unique connection ID | : BA55719E F8C10015 0 1B1E08 |

-continued

| | |
|---|---|
| Setup Time | : 11:14:39.367 UTC Mon Jun 18 2001 |
| PeerAddress (Calling number) | : 68575 |
| Disconnect Cause Code | : 10 |
| Disconnect Cause Text | : normal call clearing |
| Connect Time | : 11:14:49.707 UTC Mon Jun 18 2001 |
| Call Origin | : 2 |
| Disconnect Time | : 11:15:02.867 UTC Mon Jun 18 2001 |
| Transmit Packets | : 1509 |
| Transmit Bytes | : 102600 |
| Receive Packets | : 1509 |
| Receive Bytes | : 138828 |
| Return Call Leg | |
| Time CDR generated | |
| Connection ID | |
| Setup Time | |
| PeerAddress (Called number) | |
| Disconnect Cause Code | |
| Disconnect Cause Text | |
| Connect Time | |
| Call Origin | |
| Disconnect Time | |
| Transmit Packets | |
| Transmit Bytes | |
| Receive Packets | |
| Receive Bytes | :8828 |

The disconnect cause code values default to hexadecimal. This table shows some common hexadecimal values and their explanations:

| Hexadecimal Value | Explanation |
|---|---|
| 0x0 | Cosmetic field |
| 0x1 | Unassigned number |
| 0x3 | No route to destination |
| 0x10 | Normal call clearing |
| 0x11 | User busy |
| 0x12 | No user response |
| 0x13 | No user answer |
| 0x15 | Call rejected |
| 0x1C | Invalid number |
| 0x1F | Normal, unspecified |
| 0x22 | No circuit |
| 0x2C | No requested circuit |
| 0x2F | No resource |
| 0x3F | Service or option not available, unspecified |

For HTML (following the common log format)—Example of 13 fields of interest and how to parse them using php

```
<?php
class apache_log_parser
{
var $bad_rows; // Number of bad rows
var $fp; // File pointer
function format_log_line($line)
{
Preg_match("/^(\S+) (\S+) (\S+) \[([^:]+) : (\d+:\d+:\d+) {(\]]+)\] \"(\S+
) (,*?) (\S+)\" (\S+) (\S+) (\",*?\") (\",*?\") $/", $line, $matches); // patt
return $matches;
)
function format_line ($line)
{
    $logs = $this->format_log_line($line); // format the line
    if (isset($logs[0])) // check that it formatted OK
    {
        $formated_log = array( ); // make an array to store the lin
```
infor ln
```
        $formatted_log ['ip'] = $logs[1];
        $formated_log ['identity'] = $logs[2};
        $formatted_log ['user'] = $logs[2];
        $formated_log ['date'] = $logs[4];
        $formated_log ['time'] = $logs[5];
        $formated_log ['timezone'] = $logs[6];
        $formated_log ['method'] = $logs[7];
        $formated_log ['path'] = $logs[8];
        $formated_log ['protocol'] = $logs[9];
        $formated_log ['status'] = $logs[l0];
        $formated_log ['bytes'] = $logs[11];
        $formated_log ['referer'] = $logs[12];
        $formated_log ['agent'] = $logs[13];
        Return $formated_log; // return the array of info
    }
    else
    {
        $this->badRows++; if the row is not in the right format add it to the bad rows
        return false;
    }
}
function open_log_file($file_name)
{
    $this->fp = fopen($file_name, 'r'); // open the file
    if (!$this->fp)
    {
        return false; //return false on fail
    }
        return true; // return true on success
}
function_close_log file ( )
{
    return fclose($this->fp); //close the file
}
//gets a line from the log file
function get_line( )
{
    if (feof($this->fp))
    {
        return false;
    }
    $bits=' ' ;
    //I find for loops much much faster
    for (;!feof ($this->fp) && $bits != "\n";)
    {
        $bits .= fread ($this->fp, 1);
    }
    return rtrim($bits, "\n");
}
}
?>
```

For windows event log
>>need to add parser example and RegEx Table
For Peoplesoft log
>>need to add parser example and. RegEx Table
A RegEX operation is performed using a RegExp (processer) to extract the data and to capture the meaning of what occurred.

The ST table for each log entry may be queried at runtime via a SELECT with a JOIN operation to extract the meaning of the STRCUTRED DATA and to use it for correlation and decision making steps later.

g) Assoc=this field extracts the associated user id that the event is associated with or makes it nill. This allows the system to associate an event with a target user although the event itself may have been created by something or someone else such as a process or an administrator h) Relay=this field indicates whether or not the syslog came directly from the host or via a relay such as a load balancer. Hostnames and other attributes of the syslog are sometimes changed when they pass through a relay server Final Rules table for 7 syslogs

| ID | SL PCKT | Weight | User_Proc_ Attribute | Assoc | Relay | MR | LSA1 | LSA2 | LSA3 | EWD | DS | ST |
|---|---|---|---|---|---|---|---|---|---|---|---|---|
| 0 | BLOB | 1 | 14567 | Nill | No | nill | Ext112.company.com | TS | L | No | No | 1 |
| 1 | BLOB | 1 | 14567 | Nill | No | nill | Ext112.company.com | TS | L | No | No | 1 |
| 2 | BLOB | 1 | 14567 | Nill | No | nill | Ext112.company.com | TS | L | No | No | 1 |
| 3 | BLOB | 1 | 14567 | Nill | No | nill | Ext112.company.com | TS | L | No | No | 1 |
| 4 | BLOB | 1 | 14567 | Nill | No | Nill | Proxy.company.com | TS | L | No | No | 2 |
| 5 | BLOB | 1 | 14567 | Nill | No | nill | sqlsvr.company.com | TS | L | No | Yes | 3 |
| 6 | BLOB | 1 | 516227* | 14567 | No | nill | hr.company.com | TS | L | No | No | 4 |

TS = timestamp,
*516227 = this is the user id of the hr rep who made the change in peoplesoft.
The system extracts the MSG contents from the syslog packet and associates the event with the userid 14567.

Now we move onto graphing the 6 datapoints.

Graph creation=plot the datapoints (step 3)

For this step we will use the easyRDF program at http://www.easyrdf.org/.

This php library allows us to create the resource description framework (RDF) to build entity relationships between the logs that have been collected. RDF uses the subject-predicate-object tripe which is appropriate for this purpose.

The subject denotes the resource, and the predicate denotes traits or aspects of the resource and expresses a relationship between the subject and the object. For example, one way to represent the notion "The sky has the color blue" in RDF is as the triple: a subject denoting "the sky", a predicate denoting "has", and an object denoting "the color blue". Therefore RDF swaps object for subject that would be used in the classical notation of an entity—attribute—value model within object-oriented design; object (sky), attribute (color) and value (blue). RDF is an abstract model with several serialization formats (i.e., file formats), and so the particular way in which a resource or triple is encoded varies from format to format RDF uses globally unique identifiers for everything; the things we're talking about, the relationships, datatypes. This means two RDF graphs can be merged and there's no danger of having any confusion, eg. one dataset has a 'pitch' value for the frequency of a sound, and another for the angle of a roof. Because all RDF really is a list of unambiguous relationships, you can combine two RDF graphs and just get a bigger list of relationships between things.

RDF is a way of structuring information to be very interoperable and extendable. The most simple unit of information is called a 'triple'. A triple consists of three parts;

the ID of a thing, the ID of a property that relates that thing to another thing or a value the ID of the thing it relates to OR a value, like text, a number or date.

Install composer and Easy RDF.

First, install composer:

```
a) curl -s https://getcomposer.org/installer / php
b) Create a composer.json file in your project root:
{
"require": {
"easyrdf/easyrdf ": "*"
}
}
c) Install EasyRdf (and any other dependencies) using: php composer.phar install
1) Programmatically creating the semantic graph from the database table
<?php
/**
* Using EasyRdf_Graph directly without EasyRdf_Resource
```

```
*
* Triple data is inserted directly from an object returned from a SQL query,
* where it is stored internally as an associative array.
*/
set_include_path(get_include_path( ) . PATH_SEPARATOR . '../lib/');
require_once "EasyRdf.php";
?>
<?php
// Connect to the Database
mysql_connect("predict.db.com", "username", "password") or die(mysql_error( ));
mysql_select_db(" Predict") or die(mysql_error( ));
$data = mysql_query("SELECT * FROM syslogs ")
or die(mysql_error( ));
while($info = mysql_fetch_array( $data ))
{
$graph = new EasyRdf_Graph( );
$graph->addResource($info['lsa1], "rdf:type", "foaf:Person");
$graph->addLiteral($info['lsa1'], "foaf:weight", $info['weight']);
$graph->addLiteral($info['lsa1'], "foaf:assoc", $info['assoc']);
$graph->addLiteral($info['lsal'], "foaf:relay", $info['relay']);
$graph->addLiteral($info['lsal'],"foaf:mr", $info['mr']);
$graph->addLiteral($info['lsal'],"foaf:lsa1", $info['lsa1']);
$graph->addLiteral($info['lsal'],"foaf:lsa2", $info['lsa2']);
$graph->addLiteral($info['lsal'],"foaf:lsa3", $info['lsa3']);
$graph->addLiteral($info['lsal'],"foaf:ewd", $info['ewd']);
$graph->addLiteral($info['lsal'],"foaf:ds", $info['ds']);
$graph->addLiteral($info['lsal'],"foaf:st", $info['st']);
$graph->add("http://example.com/joe", "rdfs:label", "User");
?>
<?= $graph->dump( ) ?>
```

The code example above will query the SQL database and retrieve the 7 logs and put them into a semantic graph. This should be sufficient for purposes of this example. If the database contained more records then appropriate WHERE and OR clauses would be included in the SELECT statement.

Figure 11:
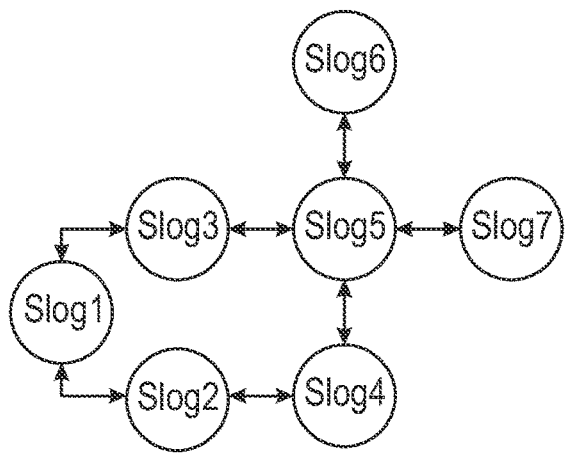
FIG. 11 shows a visual graph.

A visual of the graph is shown in FIG. 11.

Figure 12:
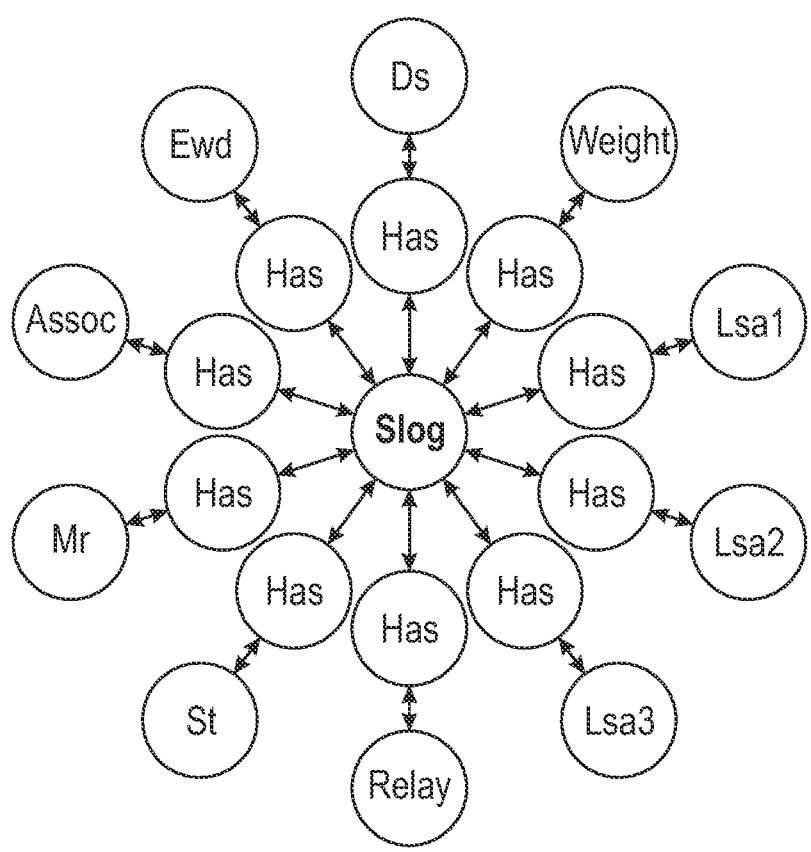
FIG. 12 shows the attributes of each slog connector.

Each Slog connector has the attributes shown in FIG. 12.

As the script iterates through each row that is returned from the database it continues to add 10 attributes to each log entity and builds relationships between each entity and all of its attributes.

After the semantic graph has been created we can move to the next step which is to look for similarities between log events. For purposes of this example we will be looking for:

the correlation in the timestamp between one log and another the correlation of the timestamp of the last privileged action (class="high" in STRUCTED DATA) [i.e. how often does the user execute this action]

the correlation of the timestamp of an event that indicates an upcoming change in role that would negatively impact another privileged action [i.e. how close in time is the upcoming role change and does the system know if this role change will invalidate the access request if attempted after the role change]

The result of the correlation (a value between 0 and 1) will be placed into the weight attribute of the nodes that are compared (correlation compares nodes in groups of 2 until all parings have been compared)

Correlation=step through correlation algorithm, (look at times, last login, termination vs privileged access request vs phone call)

Decision=assign payoffs and calculate possible outcomes and then score them and make decision based on highest score Communicate (send email, populate message on management screen)

The process therefore can be summarized with the following steps:
Manager Initialization
Behavioral Rules Engine Initialization
Tokenization Engine Initialization
Cross Channel Detection Rules Engine Initialization
Central Agent Initialization (for Agent less Operation on Hosts)
Host Agent Initialization (Log Forwarders)
An overall system algorithm proceeds as follows:
Invoking Log Collection Agent (host based or central)
Log collection and forwarding
Log parsing
Behavioral Rule Matching
Main Process
  Sub-process
Cross Channel Matching
Main Process
  Sub-process
Alerting
Responding
Virtual Patching
  Quarantining
Agent Network Discovery
Main Process
  Sub-process
Agent Security and Privacy Policy Enforcement (authenticate before collecting logs and tokenize PII)

Although a particular preferred embodiment of the invention has been disclosed in detail for illustrative purposes, it will be recognized that variations or modifications of the disclosed apparatus, including the rearrangement of parts, lie within the scope of the present invention.

What is claimed:

1. A method for predicting the likelihood future security threats in distributed computing environment comprising the steps of:
   a main server entity communicating with a plurality of decision engines and a plurality of correlation engines;
   a communication engine communicating with the main server;
   the communication engine communicating with one or more third parties, wherein the one or more third parties comprises one or more data points, wherein the one or more data points comprise a plurality of user data and event data;
   a deep learning engine receiving outputs from multiple simulation runs using sequential game theory against the one or more data points, wherein the event data is selected from the group consisting of temporal, geographic, social, financial and linguistic data;
   the deep learning engine predicting a first occurrence of a security event, wherein predicting the first occurrence of a security event is based on the receiving the outputs from the multiple simulation runs;
   building a plurality of semantic graphs based on the communicating with correlation engines;
   a plurality of distributed networked agents collecting event and attribute data for the main server entity, the plurality of correlation server engines, and the plurality of decision engines, wherein the plurality of distributed networked agents are maintained on local servers; and
   a defined protocol initiating and maintaining secure communication between the main server, the plurality of distributed networked agents, the plurality of correlation engines, the plurality of decision engines and the communication engine;
   forecasting an arrival time of the impending security threat by incorporating temporal data in a prediction process, wherein the prediction process comprises:
   discovering said agent servers;
   determining an available processing bandwidth of the main server, agents, decision engines, and correlation engines;
   registering said main server and available agent server with registration entity;
   correlating event and attribute data from unstructured data sources;
   collecting log data;
   normalizing and tokenize the log data;
   generating semantic graphs of the log and the attribute data; and
   deciding on the likelihood of an event using the sequential game theory.

2. The method according to claim 1, wherein the step of deciding on the likelihood of an event using the sequential game theory, further comprises:
   discovering attempts to hide an observation of events by staging other events;
   discovering attempts to hide the observation of events by utilizing a plurality of communications channels to execute an attack; and
   making predictions in the event of partial data loss.

3. The method according to claim 1, wherein the method for distributing workload further comprises:
   breaking data analysis work across an virtually unlimited amount cpu cores in order to scale data processing to handle an unlimited amount or log and attribute data; and
   shifting workload in the event of a catastrophic loss of processing agents with minimal loss of fidelity, wherein auto provision of processing agents as bandwidth, log and processing demands increase or decrease.

4. The method according to claim 2, wherein the step of collecting log data further comprises:
   self healing databases while still processing transactions due to a security attack, a loss/addition of one or more virtual machine cores, a memory/disk buffer overwrite, a major shift in workload, or a hardware failure.

* * * * *